United States Patent
Zhu et al.

(10) Patent No.: US 8,116,256 B2
(45) Date of Patent: Feb. 14, 2012

(54) WIRELESS DATA FRAME STRUCTURE AMONG NODES

(75) Inventors: Chenxi Zhu, Gaithersburg, MD (US);
Wei-Peng Chen, Santa Clara, CA (US);
Jonathan Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 1014 days.

(21) Appl. No.: 11/831,108

(22) Filed: Jul. 31, 2007

(65) Prior Publication Data

US 2008/0186950 A1    Aug. 7, 2008

Related U.S. Application Data

(60) Provisional application No. 60/822,861, filed on Aug. 18, 2006, provisional application No. 60/822,791, filed on Aug. 18, 2006.

(51) Int. Cl.
*H04B 7/212* (2006.01)
(52) U.S. Cl. ....................... 370/324
(58) Field of Classification Search .......... 370/324, 370/329, 322, 330, 350, 503, 315, 316, 331, 370/509; 455/436, 442, 452.1, 450, 464; 375/364
See application file for complete search history.

(56) References Cited

U.S. PATENT DOCUMENTS

| | | | |
|---|---|---|---|
| 4,573,207 A * | 2/1986 | Smith et al. | 455/509 |
| 5,673,259 A * | 9/1997 | Quick, Jr. | 370/342 |
| 6,185,190 B1 | 2/2001 | Dreyer et al. | |
| 6,912,261 B2 * | 6/2005 | Aslanis et al. | 375/364 |
| 7,359,349 B2 * | 4/2008 | Kayama et al. | 370/329 |
| 2006/0099954 A1 | 5/2006 | Martinez et al. | |

FOREIGN PATENT DOCUMENTS

WO   WO 2006045499 A1   5/2006

OTHER PUBLICATIONS

Notification of Transmittal of the International Search Report and the Written Opinion of the International Searching Authority, or the Declaration issued by the International Searching Authority on Jan. 30, 2008 in International Application No. PCT/US07/74850 (7 pages).
Korean Notice of Preliminary Rejection mailed Oct. 26, 2010 in Korean Patent Application No. 10-209-7005578 (5 pages) (3 pages English Translation).
Japanese Office Action issued May 31, 2011 in related Japanese Patent Application No. 2009-524726 (3 pages).
Xiaobing Leng et al., "A Frame Structure for Mobile Multi-hop Relay with Different Carrier Frequencies," IEEE C802.16 MMR-05/025, Nov. 11, 2005.
Gang Shen et al., "Recommendation on 802.16 MMR with Backward Compatibility," IEEE C802.16mmr-05/023, Nov. 11, 2005.

* cited by examiner

*Primary Examiner* — Chi Pham
*Assistant Examiner* — Alexander Boakye
(74) *Attorney, Agent, or Firm* — Staas & Halsey LLP (57) ABSTRACT

The embodiments provide transmitting at same time first and relay second node preambles aligning data frames among the first node and the relay second node wirelessly communicating in a channel and transmitting by the first node one or more radio resource control parameters managing radio resources of the wireless communicating in the channel among the aligned first node and the relay second node. A relay resynchronization amble sequence managing synchronizing in the channel the first node frames with the relay second node frames is periodically transmitted to the relay second node.

20 Claims, 7 Drawing Sheets

WIRELESS DATA FRAME STRUCTURE AMONG NODES

CROSS-REFERENCE TO RELATED APPLICATION(S)

This application is related to and claims priority to U.S. provisional application entitled MANAGING A WIRELESS NETWORK having Ser. No. 60/822,861, by Chenxi Zhu, Wei-Peng Chen and Jonathan Agre, filed Aug. 18, 2006 and related to and claims priority to U.S. provisional application No. 60/822,791 filed Aug. 18, 2006, all of which are incorporated by reference herein.

BACKGROUND

1. Field

The embodiments discussed herein relate to a wireless communication device/network frame structure.

2. Description of the Related Art

In a wireless cellular network, users in different parts of a cell usually experience different signal qualities and thus different degrees of Quality of Service (QoS). This is because the channel quality of a user depends on many factors including path loss, shadowing and interference. Users at the cell edge often suffer strong interference from neighboring cells and observe lower Carrier to Interference-plus-Noise Ratio (CINR). In an urban environment, big buildings pose a serious blockage to users behind and sometimes generate coverage holes. Signal penetration and attenuation inside buildings or tunnels also degrade the signal quality significantly. Often it is not possible to improve the signal qualities to these under-serviced areas by increasing the transmission power or changing the antenna configurations. Reducing the cell size and deploying more base stations will improve the situation, but this is often not possible due to limited access to traditional cell sites and wired backhaul links, and the associated high operating cost.

SUMMARY

It is an aspect of the embodiments discussed herein to specify radio resource control parameters managing radio resources of wireless communication in a single channel among aligned or synchronous, in frame structure, first node and relay second node to third nodes and periodically transmit to the relay second node a relay resynchronization amble sequence managing the aligning in the single channel of the first node frames and the relay second node frames. The embodiments are not limited to a single channel, but according to an aspect of an embodiment, a plurality of channels may be among such nodes for which radio resource control parameters are specified and the alignment of frame structures are maintained by the relay resynchronization amble sequence.

According to an aspect of an embodiment, the wireless communication is in an MMR-cell including a single base station (BS) in wireless communication with one or more mobile stations through one or more relay stations (RS), and the embodiments provide a benefit of higher cell capacity and better coverage to the cell area serviced by the single BS. According to another embodiment, a network is comprised of many BS and many RS, where all the BS and RS are synchronous in their frame structure. Another benefit is creating a method to deploy RSs in the cell area covered by the single BS in the single channel, while operations of RSs are not distinguishable from the BS from the MS point of view.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

The embodiments relate to sharing the same spectrum or same frequency band (channel) as a radio resource among wireless communication devices (wireless devices/nodes) that wirelessly communicate with each other in a single channel according to one or more of TDD, and/or FDD systems. According to an aspect of an embodiment, a wireless communication data frame structure provides digital relaying in-band, via a relay second device, the information between a first device and one or more third device(s). A radio resource refers to wireless communication bandwidth according to applicable wireless communication network access systems (MAC/physical layer systems) accessing the wireless communication network. Bandwidth can comprise sub-carriers/subchannels (if any), symbols, time slots, transmission power, time-slots, frequency, or portions thereof, or any combinations thereof. In-band refers to a single channel not requiring another frequency band by using the same frequency band among cascading wireless communication links among the first and the relay second device(s) to the one or more third device(s). According to an aspect of an embodiment, any device between two devices that performs digital baseband and radio transmission/receiving function(s) (i.e., performs applicable signal/data processing) can be a relay device. According to an aspect of an embodiment, the first node indirectly controls the one or more third nodes through the relay second node.

The embodiments can be included in any wireless communication network using Time Division Duplex at the media access control (MAC) and/or physical layers. For example, the embodiments are not limited to but can be included in any Broadband Wireless Access Standards, such as (without limitation) IEEE 802.16 standards (also known as Worldwide Interoperability for Microwave Access (WiMAX) networks), and which at the MAC and/or physical layers specify various and/or combinations of wireless communication network access specifications based upon Time Division Duplex (TDD) systems, employing (without limitation) Time Division Multiple Access (TDMA), and/or Code Division Multiple Access (CDMA), and/or Frequency Division Multiple Access (FDMA), and/or orthogonal frequency-division Multiple Access (OFDMA), or any combinations of the above schemes.

In a WiMAX wireless cellular network, using radio relays can be an effective way to increase the signal quality of the users by replacing a long, low quality communication link between a Base Station (BS) and a Mobile/Subscriber Station (MS/SS) (hereinafter referred to as MS) with multiple shorter, high quality links through one or multiple Relay Stations (RSs). As relay stations do not require their own wired backhauls, and are often less sophisticated than a full functional BS, relay stations are less expensive to deploy and operate than a traditional BS. A relay station could extend the service of the BS to coverage holes where users would otherwise not get services, and extend the effective cell size of a BS. A relay station could also be used to improve the Carrier to Interference-plus-Noise Ratio (CINR) and Quality of Service (QoS) of the users and enhance the cell capacity.

A relay technique can be by IEEE 802.16 standard, including in the 802.16j Relay working group. In IEEE 802.16 standard, a relay station communicates to the BS like a MS, and communicates with the MS in its coverage area (called RS-microcell) like a BS. The overall service coverage area of a BS and all the associated RSs can be called a Mobile Multi-hop Relay-Based Cell (MMR-cell or MMR network). There are three types of relay stations: fixed, nomadic and mobile RS. The first two types of RS are either fixed at a location permanently or for a time much longer than the typical session of a user. A mobile RS is typically installed on a moving vehicle and provides services to those MSs in the vehicle. The embodiments relate to operations of all types of RSs.

Figure 1:
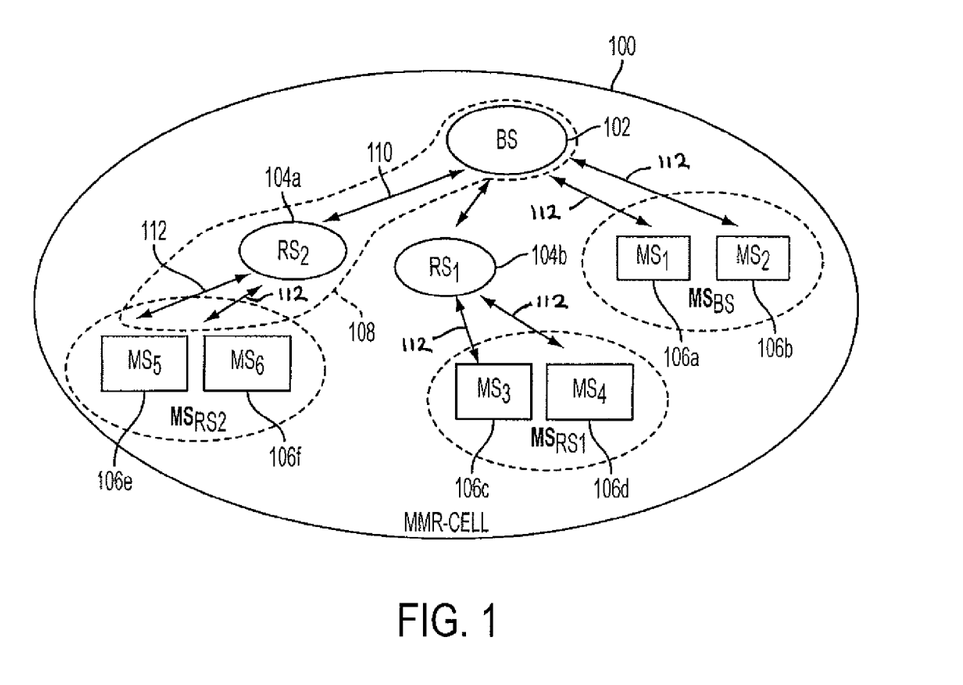
FIG. 1 is a diagram of a topology of an MMR-cell, according to an embodiment.

The embodiments apply to a wireless communication network with three or more wirelessly communicating nodes sharing a single frequency. In one example embodiment, FIG. 1 is a diagram of a topology of an MMR-cell 100 with a BS 102 and two relay stations (RS1 and RS2) 104a, 104b. The BS 102 is serving the $MS_{1-6}$ 106a-f in the set $MS_{BS}$ directly ($MS_1$ 106a and $MS_2$ 106b). Two relay stations ($RS_1$ 104a, $RS_2$ 104b) are used to extend the coverage of BS 102 and serve $MSs_{3-6}$ 106c-f in the set $MS_{RS1}$ ($MS_3$ 106c, $MS_4$ 106d) and $MS_{RS2}$ ($MS_5$ 106e, $MS_6$ 106f). The MMR-cell 100 includes the communication coverage area of the BS 102 and all the RSs 104. A relay link 110 refers to a single communication link (uplink/downlink) between BS↔RS, or between a master RS to its slave RS. An MS access link 112 refers to a single communication link (uplink/downlink) involving an MS 106, for example, between RS↔MS or BS↔MS. An RS microcell 108 refers to a communication coverage area (uplinks/downlinks) of the BS 102, a single RS 104 and MSs 106 directly serviced by the single RS 104. Uplink communication refers to communication from MS to RS to BS, or from MS to BS directly, and downlink communication refers to communication from BS to RS to MS, or from BS to RS directly.

The frame structure in the MMR cell 100 determines how the BS 102 and the RSs 104 can share the radio resources. This can be crucial to the MMR's 100 capability to provide QoS to the MSs 106. As a RS 104 provides relay functions between the BS 102 and the MSs 106 (and possibly other RSs 104), the RS 104 can communicate to the BS 102 like a MS 106 and communicate to the MSs 106 like a BS 102. If the RS 104 only has a single radio interface, the RS 104 has to switch its radio between the BS↔RS and the RS↔MS interfaces. Therefore time domain multiplexing of BS↔RS and RS↔MS communication is required.

Figure 2:
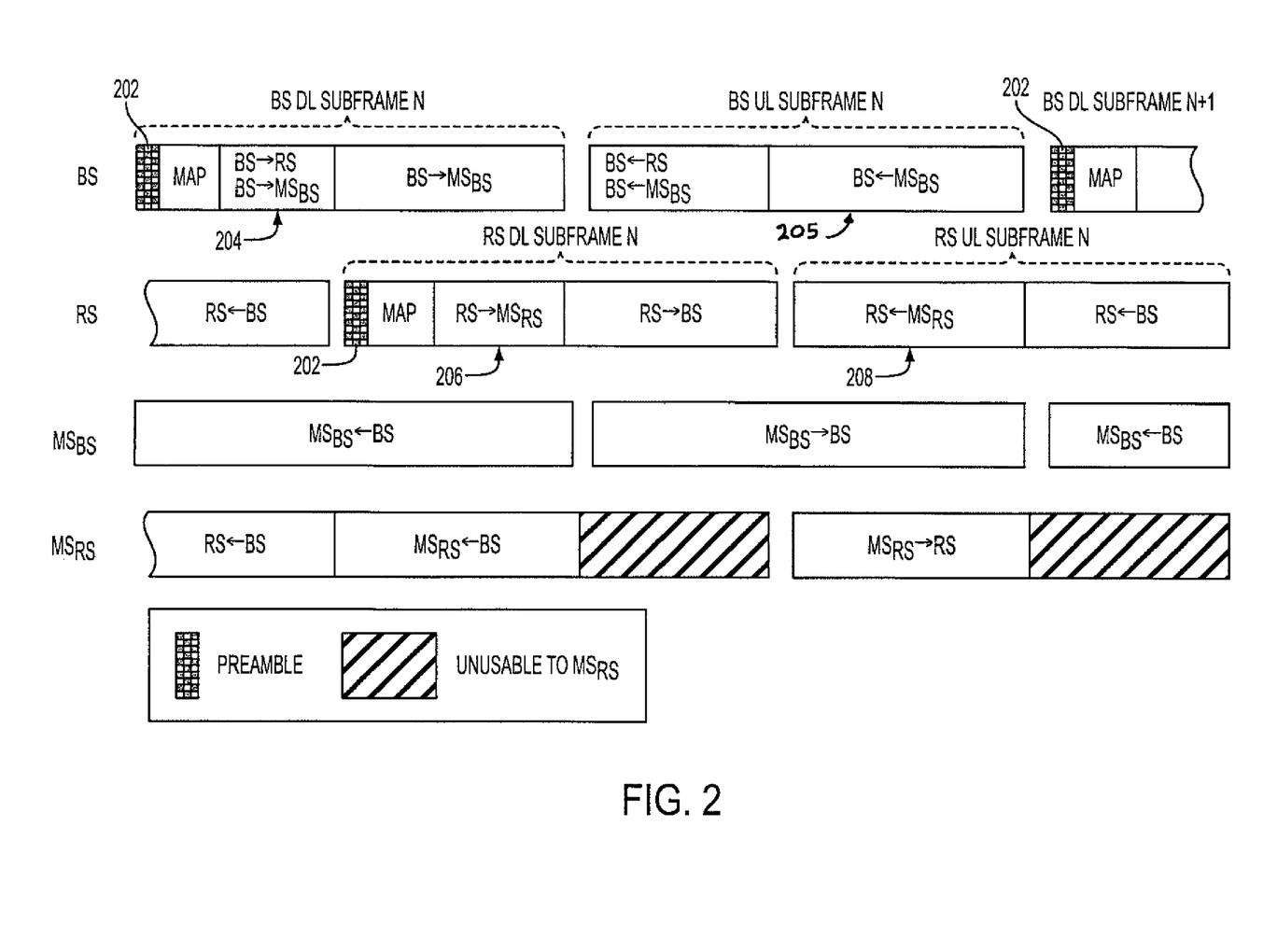
FIG. 2 is a diagram of a TDD frame structure in an unaligned uplink and downlink communication in an MMR-cell.

FIG. 2 is a diagram of TDD frame structure in an unaligned downlink and uplink communication in an MMR cell. In FIG. 2, the BS 102 and RS 104 transmit preambles at different time. The transmission windows: BS→RS, RS→$MS_{RS}$, RS→BS and $MS_{RS}$→RS, all have fixed duration and cannot be adjusted based on the traffic in the RS-microcell 108. More particularly, the MMR cell 100, a BS 102 transmits a regular preamble sequence 202 periodically at the beginning of every frame. This preamble 202 defines the beginning of a TDD frame for the entire MMR cell 100. Preamble 202 is used by the MSs 106 to locate the network and achieve synchronization with the BS 102. In order to provide service to those MSs 106 that cannot receive from the BS 102 directly, a RS 104 needs to service these MSs 106 just like a regular BS 102, including transmitting a preamble 202 (203) in every frame. The location of the preamble 202 transmitted by the RS 104 relative to the BS preamble 202 defines the time relationship between the BS frame 204 and the RS frame 206. For example, a position of the preambles 202 can determine how much of the RS 104 downlink subframe 206 can be used for RS 104 to transmit to its MSs 106, and how much of the RS 104 uplink subframe 208 can be used for these MSs 106 to transmit to the RS 104. Because a MS 106 expects the preamble 202 at a fixed location, an RS 104 cannot shift its frame arbitrarily. This makes the amount of radio resources that can be used to service the MSs 104 in an RS microcell 108 fixed, i.e. the transmission windows BS→RS, RS→$MS_{RS}$, RS→BS, $MS_{RS}$→RS is fixed, and the transmission windows in the single channel among the BS, RS and MS cannot be adjusted based upon the traffic requirement in the RS microcell 108. This can limit the flexibility to support dynamics in a MMR cell 100. It also forces a MS to shift its frame alignment when it moves from the coverage area of the BS to the coverage area of the RS. In some network where all the BS have aligned frame timing, this is undesirable, because it requires longer search time for the MS and may cause service disruption during handoff between a BS and a RS.

According to an aspect of an embodiment, the wireless communication network is the MMR-cell 100, and the first device is a BS 102, the relay second device is the RS 104 and the third device is an MS 106 (e.g., a wireless telephone, wireless personal digital assistant, wireless media player). The embodiments provide for among a first device and a relay second device to one or more third devices, using a single channel to wirelessly communicate, a frame structure specifying/defining and maintaining a communication (transmission/reception) schedule of the first device transmitting at what time to the relay second device and/or the relay second device at what time to a third device. In one example embodiment, the communication schedule in a single channel between the first device and the relay second device, and the relay second device to the third device are aligned and dynamically (real-time) maintained aligned. According to another embodiment, such communication schedule is dynamically adjusted from alignment according to application criteria.

Figure 3:
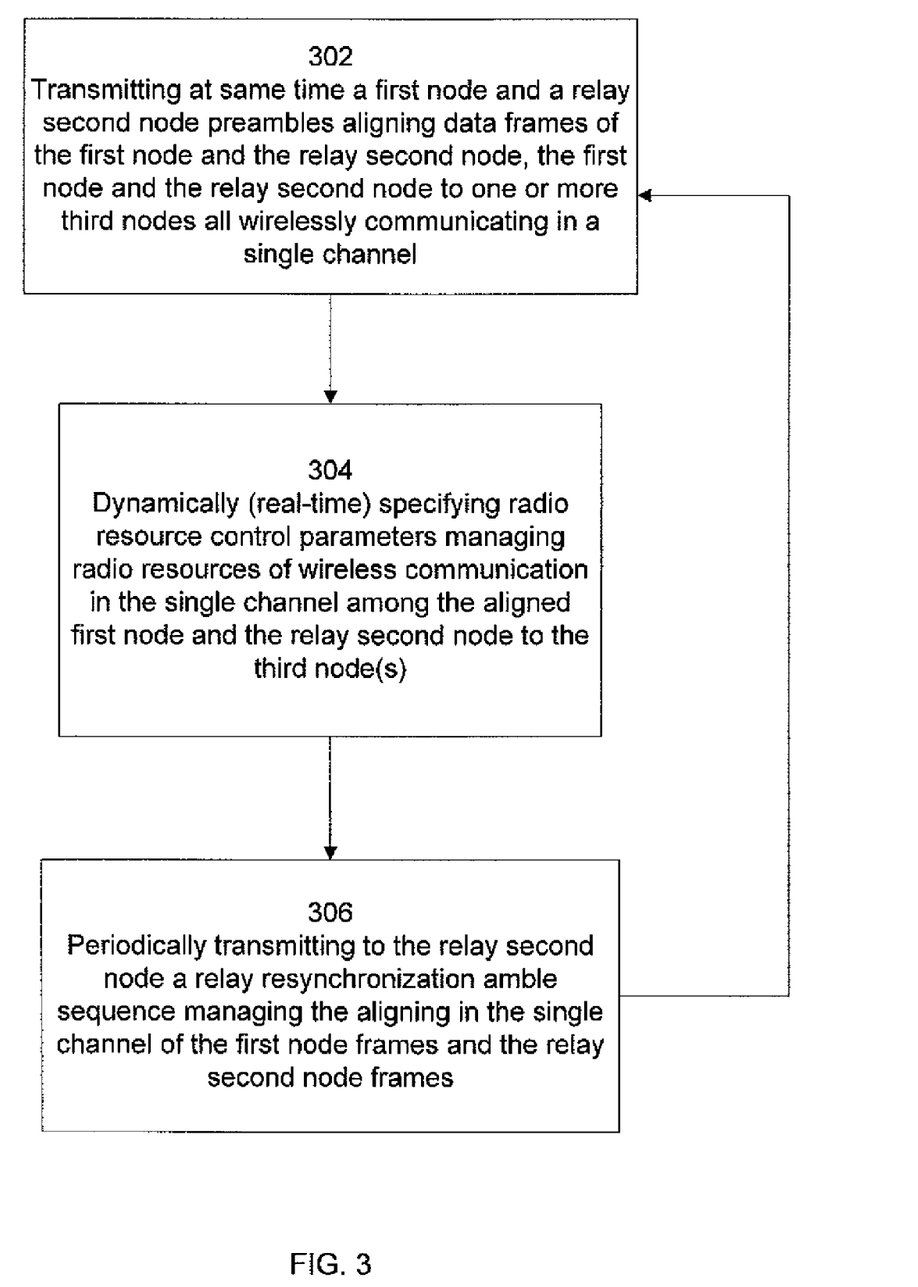
FIG. 3 is a flow chart of assigning amount of radio resources in a single channel among wirelessly communicating nodes, according to an embodiment.

FIG. 3 is a flow chart of adjusting amount of radio resources in a single channel among wirelessly communicating nodes, according to an embodiment. At operation 302, a synchronous network is started among a first node in digital in-band relay communication via a relay second node to one or more third nodes. For example, the first node transmits a start frame amble (preamble), and the relay second node transmits a preamble to a third node (for example, user stations), at same time in a single channel (in-band). A synchronous network refers to when all downlink and uplink frames by the first and the relay second node in the single channel are aligned by transmitting at same time the preambles of the first node and the relay second node. According to an aspect of an embodiment, the relay second node is configured to function as a relay. According to an aspect of an embodiment, the first node controls or coordinates the data frame alignment with the relay second node. In one example embodiment, the first node is a BS 102, the relay second node is an RS 104 and the third node(s) are MSs 106 in the MMR-cell 100.

At operation 304 dynamically (real-time) specifying radio resource control parameters managing radio resources of wireless communication in a single channel among the synchronous first node and the relay second node to the third node(s). According to an aspect of an embodiment, operation 302 can be repeated at any time for further radio resource management, including relay synchronization. Radio resource managing refers to controlling communication, assignment (allocation/partitioning), initialization/configuration, reconfiguration, adjustment; maintenance, testing/simulation, etc. of a wireless resource and/or wireless communication using the wireless resource.

At operation 306, the first node periodically transmits to the relay second node a relay resynchronization amble sequence managing synchronizing in the single channel the first node frames with the relay second node frames. According to an aspect of an embodiment, a relay resynchronization amble sequence can be transmitted at various locations (i.e., anywhere from beginning to end) in a downlink communication link data frame to a relay. A relay resynchronization amble sequence (intermediate relay synchronization amble sequence) refers to any amble sequence, other than a start frame amble (preamble), resynchronizing the first and relay second node and transmittable at various locations (i.e., anywhere from beginning to end) in a downlink communication link data frame to a relay. For example, the relay resynchronization amble sequence can be transmitted near middle of a communication link subframe as a midamble, or at end or near end of the communication link subframe as a postamble, or any combinations thereof. According to an aspect of an embodiment, for example, related provisional application No. 60/822,861 from which the present application claims priority and a related copending non-provisional patent application No. 11/830,929 based thereon entitled "NEW AND LEGACY WIRELESS COMMUNICATION DEVICE COEXISTING AMBLE SEQUENCE" by Chenxi Zhu, Wei-Peng Chen and Jonathan Agre, describe a method of constructing and broadcasting a relay synchronization amble sequence, the contents of which are incorporated herein by reference.

Figure 4:
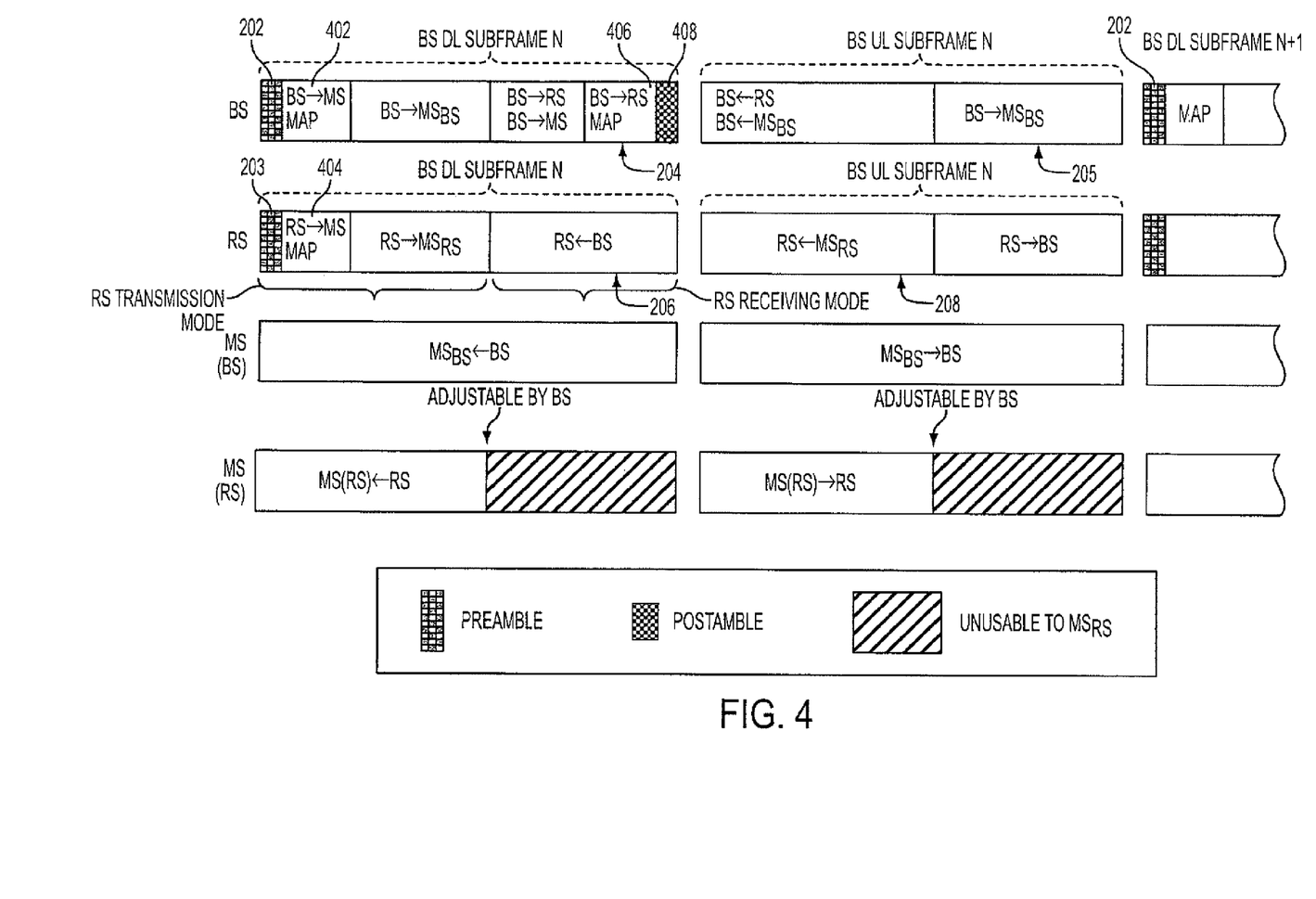
FIG. 4 is a diagram of a TDD frame structure in uplink and downlink communication in an MMR-cell, according to an embodiment.

FIG. 4 is a diagram of a TDD frame structure in uplink and downlink communication in an MMR-cell, according to an embodiment. However, the embodiments are not limited to an MMR-cell, and can be provided for any wireless communication network. In FIG. 4, the embodiment new frame structure, a RS 104 transmit its preambles 202 at the same time as the BS 102 preambles 202, so the frame in the BS 102 and the frame in the RS 104 coincide. Having the frames of BS 102 and RSs 104 aligned may also benefit the MS 106 handoff to a next cell (e.g., RS-microcell 108, MMR cell 100, etc.), because the entire network might be synchronized. In the downlink subframe, a RS first receives transmission from BS in the first part of the subframe, and then forwards the relevant information to MS by transmitting to MS in the second part of the downlink subframe. In the uplink subframe, a RS first receives from its MS, and then forwards the information from MS to BS by transmitting to BS in the second part of the uplink subframe. The BS transmits to those MSs that the BS can not reach directly (or cannot reach with high enough signal quality without using relay) through relaying information back and forth through the RS. The operation of the MSs 106 is not described, because MSs 106 cannot tell the difference between a BS 102 and a RS 104. The fact that all the BS and RS in the network transmit preamble at the same time to have synchronous frame timing makes it possible for a MS to search, and to establish connectivity with a RS just like a BS, because the operation of RS is intended to be indistinguishable with that of a BS.

In FIG. 4, the operation of the BS 102 and the RSs 104 is as follows. Suppose the BS 102 is operating in a MMR cell 100. When a RS 104 is first turned on, initially the RS 104 operates like a MS 106 in receiving/searching mode. The RS 104 searches for the preamble 202 from the BS 102 just like a regular MS 106. After the RS 104 gets synchronization with the BS 102, the RS 104 undergoes initial ranging and access like a MS 106, plus any additional message exchange (including authentication, authorization, configuration messages, etc). After these initializations, the RS 104 switches to RS operating mode and starts to transmit the RS 104 preamble 202 for MSs 106 to lock for wireless communication. The RS 104 preamble 202 is sent at the same time as the BS 102 preamble 202. The RS 104 may (per request from the BS) transmit the RS 104 preamble 202 in the same or a different set of subcarriers and with a same or different amble sequence than the BS 102. In FIG. 4, the BS 102 frame and the MS 104 frame are aligned in time with each other. In the beginning of the DL subframe, both the BS and RS transmit their respective preambles 202 and a UL/DL-MAP to their associated MSs. A UL/DL MAP message refers to any radio resource control message including parameters managing radio resources of a wireless communication.

According to an aspect of an embodiment, a first node (e.g., BS 102) transmits a separate relay MAP message targeted for a relay second node. Typically, the UL/DL Map message by the first node is targeted to third nodes (MS 106a, 106b) directly in communication with the first node. In case of a relay second node between the first and third node, the relay map message to the second node is sent to the relay second node (RS 104a, 104b) to control the transmission and reception between the first node and the relay second node. According to an aspect of an embodiment, the first node splits or divides the UL/DL MAP message into two parts targeted for the third node and the relay second node, respectively, and transmits each part thereof separately to the relay second node (e.g., RS 104) and to one or more third nodes (e.g., MSs 106).

In particular, as the UL/DL-MAP, both the BS 102 and the RS 104 transmit to their MSs 106 in the beginning of the DL subframe a BS→MS_MAP 402 and a RS→MS_MAP 404. According to an aspect of an embodiment, the DL/UL MAP message from the BS 102 has been split into two messages, a BS→$MS_{BS}$_MAP 402 and BS→RS_MAP 406. The BS→$MS_{BS}$_MAP 402 carries the channel portion assignment information (information regarding the portion of radio resource that RS can use for its transmission with its $MS_{RS}$) as well as information regarding the transmission between the BS and MS that the BS 102 prepares for its MSs ($MS_{BS}$) 106 and is sent by the BS 102 in the beginning of the DL subframe 204. The RS→$MS_{RS}$_MAP 406 carries the channel portion assignment message from the RS to its associated MSs ($MS_{RS}$) 106. Channel assignment refers to assigning a portion of a radio resource used among nodes, for example, a portion of an in-band radio resource (a portion of a single channel). A single channel can refer to any radio resource including one or a plurality of bands providing a limited radio resource and targeted for use by nodes, and may be apportioned according to the embodiments.

Because a RS 104 has to multiplex its radio between communicating to the BS 102 and the $MS_{RS}$ 106, only in the first part of the downlink subframe 204 and the uplink subframe 205, the RS 104 can communicate with its $MS_{RS}$ 106. According to an aspect of an embodiment, the. BS→RS_MAP 406 is prepared by the BS 102 for RS targeting those MS 106 connected to the RS 104 directly and in addition may carry the channel assignment information for any combination of downlink and/or uplink communication links of the RSs 104 to the Rs's 104 MSs 106. According to an aspect of an embodiment, the BS→RS_MAP 406 is prepared by BS and carries channel assignment information for all the RS 104 related to transmission between BS and RS in the uplink and downlink, and may be sent by the BS 102 at the end of the downlink subframe 204 and broadcasted or multicasted to all the RSs 104. If the BS→RS MAP is sent at the end of every downlink subframe, the RS 104 could be programmed, or controlled via a transceiving switch parameter by the BS 102, to expect the BS→RS_MAP 406 at the end of the frame as broadcast, so by transmitting the BS→RS_MAP 406 at end of the frame, the RS 104 might not have to unnecessarily switch to the receiving mode until the end (measured in time) of the frame. In other words, transmitting the BS→RS_MAP 406 at the end of the frame reduces RS 104 transceiver switch time. Although, the embodiments are not limited to such a configuration, for example, if a broadcast to all the RSs 104 is not desired or transceiver switching time is not a concern. In this BS→RS_MAP 406, the BS 102 specifies the DL and UL channel assignment for transmissions between the BS 102 and the RSs 104. The BS→RS_MAP 406 also specifies which part of the resource (in terms of time slots or symbols) the RSs 104 can use in the coming frames for transmitting to and receiving from their respective MSs 106. A burst profile of the next BS→RS_MAP message is also specified in the current BS→RS_MAP 406.

According to an aspect of an embodiment, for each RS 104, the BS 102 can schedule a guard time of a symbol 408 during the DL subframe 204 for the RS 104 to switch from transmitting mode to receiving mode. There is no limit as to when a RS 104 has to switch from transmitting mode (transmitting to its $MS_{RS}$) to receiving mode (receiving from the BS), as long as a RS switches to receiving mode in time to receive from its BS according to the BS→RS MAP. This switch time can differ from RS to RS. This way the BS 102 dynamically determines how much of the DL subframe can be used for BS→RS and RS→$MS_{RS}$ transmission. Also, an RS 104 is in receiving mode in the beginning of uplink subframe to receive from its $MS_{RS}$, then switches to transmitting mode to transmit to the BS 102 in the second part of the uplink subframe. This switching time is also specified by the BS in the previous BS→RS_MAP 406 and is based on the bandwidth requirements on the RS→BS and $MS_{RS}$→RS links and may be variable from frame to frame. This way the single radio resource assignment in the RS microcell 108 of the MMR cell 100 can be made very flexible and accommodate network dynamics very well.

In FIG. 4, because the clock at RS 104 may drift from that of the BS 102 (i.e., the BS and the RS might desynchronize), RS 104 can periodically resynchronize with the BS 102. BS 102 can transmit a special symbol 408 as a relay resynchronization amble 408 to RS 104, for example, once in every M frames at end of downlink subframe. The relay resynchronization amble 408 resynchronizes the RS after the initial synchronization at operation 304 via the preamble 202. This special relay resynchronization symbol can be called a midamble or a postamble, if it is not at the beginning of the frame, but near the middle or at the end of the frame, respectively. The exact location of the relay resynchronization amble sequence can be specified by the previous BS→RS_MAP message. One example place (without limitation) for the relay resynchronization amble sequence is the last symbol of the DL (UL as the case may be) subframe 204, because all the RSs are in receiving mode at this time. This allows the amble to be incorporated (e.g., included, adjacent, etc.) as part of the BS→RS_MAP message, so that both the BS→RS_MAP 406 and the relay resynchronization amble are received by the RS in same or one receiving mode session. A special bit can be reserved in the BS→RS_MAP message to indicate, if the next BS→RS_MAP message includes a relay mid synchronization amble in the last symbol. According to an aspect of an embodiment, the relay resynchronization amble might only be recognizable to RSs 104, but invisible or transparent to MSs 106, because the MSs 106 would not need such relay resynchronization amble and locking thereon could be inefficient by wasting processing time.

In FIG. 4, BS 102 and RS 104 transmit preambles 202 at the same time and BS 102 occasionally transmit the relay resynchronization postamble sequence 408 (in FIG. 4 referred to as postamble 408) for RS 104 synchronization. The position of the postamble 408 (not necessarily in every frame) 408 and the BS→RS MAP 406 message can be instructed by the BS 102 in the previous BS→RS MAP message 406 (or other RS configuration message) and the rate of relay resynchronization amble sequence is adjustable (subject to some minimal rate requirement). In other words, when a RS 104 is turned on, the RS 104 first exchanges information with BS 102 as a MS 106. The RS 104 then starts its own frame by transmitting a preamble 202 and a DL/UL_MAP aligned with BS 102. A RS frame 206 is aligned with a BS frame 204. In one example embodiment, the BS 102 splits its UL/DL MAP into 2 parts: BS→MS_MAP 402 sent in the beginning of DL frame and BS→RS_MAP 406 sent at end of DL frame, however, the embodiments are not limited to such a configuration and the UL/DL MAP might not be split. Further, BS 102 occasionally sends a new relay resynchronization postamble sequence 408 at end (near end) of DL BS frame 204 for RS synchronization, for example, after the BS→RS_MAP 406 or within a small time gap.

In the example embodiment based upon MMR 100, to support the embodiment frame structure, the following new messages can be defined:

1. A default CID (connection ID) known to all the RSs in the MMR 100. Used for broadcast messages from BS to all the RSs (BS→RS configuration message for example).

2. BS→RS_MAP 406 includes one or more of the following parts in any combinations:
   a. BS→RS broadcast information.
      i. Specify the location of the relay resynchronization amble sequence 408 in the next frame, if one is present and is not part of the BS→RS_MAP message 406. If the amble 408 is part of (included/contains) or positioned right after the BS→RS_MAP, or if it is always the last symbol of the frame, then specifying location thereof in the data frame might not be necessary. If multiple ambles 408 are possible, specify the index of the amble used for the RS.
      ii. The burst profile of the next BS→RS_MAP, including the subcarriers (subchannels) used, the symbols used, coding scheme and repetition code used, and if a amble 408 is included in the last symbol of the BS→RS_MAP 406.

b. BS→RS$_i$ DL_MAP
   i. Specify the transmission from BS to RS$_i$ in the next DL subframe 204 for the applicable physical layer system, for example, OFDMA. Transmission specification may include one or more (any combination) of channel portion assignment, the subcarriers (subchannels) used, the symbols used, coding scheme, transmission power and repetition code used for transmission, along with information related to the packets sent in the transmission burst.

c. RS$_i$→BS UL_MAP
   i. Specify the transmission from RS$_i$ to BS in the upcoming UL subframe following the time relevance defined by the network, for the applicable physical layer system, for example, OFDMA. Transmission specification may include information similar to the transmission specification in the BS→RS$_i$ DL_MAP.

d. RS$_i$→MS DL_MAP
   i. For each RS$_i$, specify the DL radio resources for the applicable physical layer system, for example, OFDMA (segment, subcarriers/subchannels, symbols, and maximal transmission power) that RS$_i$ can use for transmission to MS$_{RSi}$. It might not specify the detailed burst profile of the RS$_i$→MS$_{RSi}$ transmissions. In other words, the BS→RS_MAP 406 may include (comprise) channel assignments for the RS 104 to the RS's 104 associated MSs 106. The RS$_i$ uses information provided in this DL_MAP when scheduling its DL transmission to MS$_{RSi}$ and generating its RS→MS$_{RSi}$ DL_MAP.

e. MS→RS$_i$ UL_MAP
   i. For each RS$_i$, specify the UL radio resources for the applicable physical layer system, for example, OFDMA (subcarriers/subchannels, symbols) that RS$_i$ can use for transmission from MS$_{RSi}$ to RS$_i$. It might not specify the detailed burst profile of the MS$_{RSi}$→RS transmissions. The RS$_i$ uses information provided in this UL_MAP when scheduling the UL transmission from MS$_{RSi}$ and generating its RS→MS$_{RSi}$ UL_MAP.

Figure 5:
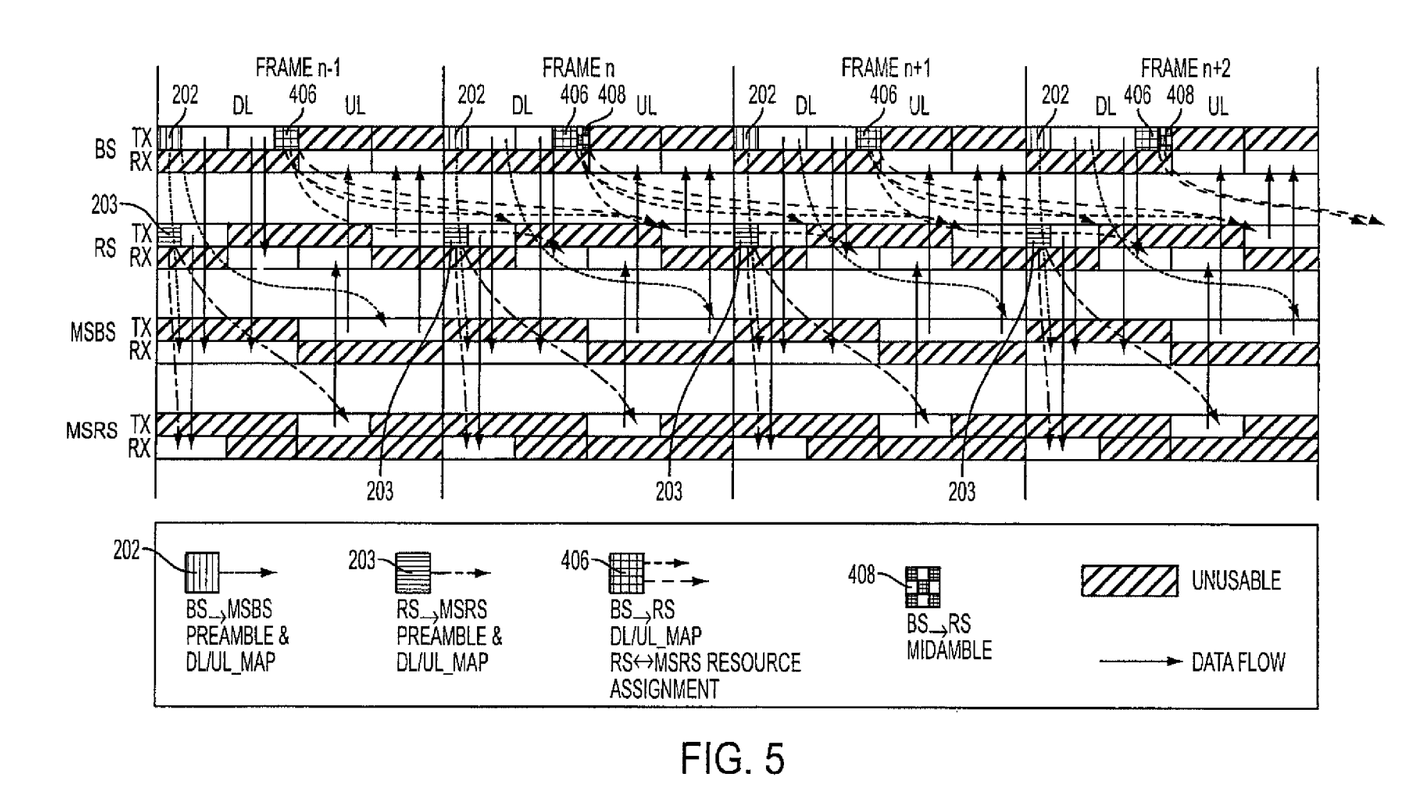
FIG. 5 is a diagram of time relevance of control messages and data flow using a TDD frame structure in uplink and downlink communication in an MMR-cell, according to an embodiment.

The channel portion assignment made in RS$_i$→MS DL_MAP and MS→RS$_i$ UL_MAP are effective from the kth and lth frame from now (k and l may differ for UL and DL and specified by the BS in the BS→MS_MAP) until changed by the next BS→RS_MAP carrying this information. FIG. 5 is a diagram of time relevance of control messages and data flow using an embodiment TDD frame structure in uplink and downlink communication in an MMR-cell, according to an embodiment. In FIG. 5, the data flow arrows extending from a colored designated block have the same color designation as the colored designated block. In FIG. 5, the minimal time between UL-MAP and the scheduled uplink transmission is assumed.

According to an aspect of an embodiment, a two-tiered radio resource management can be conducted given the embodiment frame structure, where the BS 102 assigns the portion of radio resource assigned to each RS 104 for its UL/DL transmission with the MSs 106 served directly by the RS 104 or under the RS control (MS$_{RS}$), and the detailed transmission schedule between a RS 104 and its directly serviced MS$_{RSs}$ 106 (a collection of MS access links 112) are managed by the RS 104 via the RS→MS Map 404. This reduces the communication overhead between the RS and BS and BS's computation load to generate the detailed transmission schedule for each RS, while increasing the capacity in each RS microcell 108 due to the more updated channel quality information to each MS at the RS and the prompt response of the RS to these changing channel information to the MS.

Figure 6:
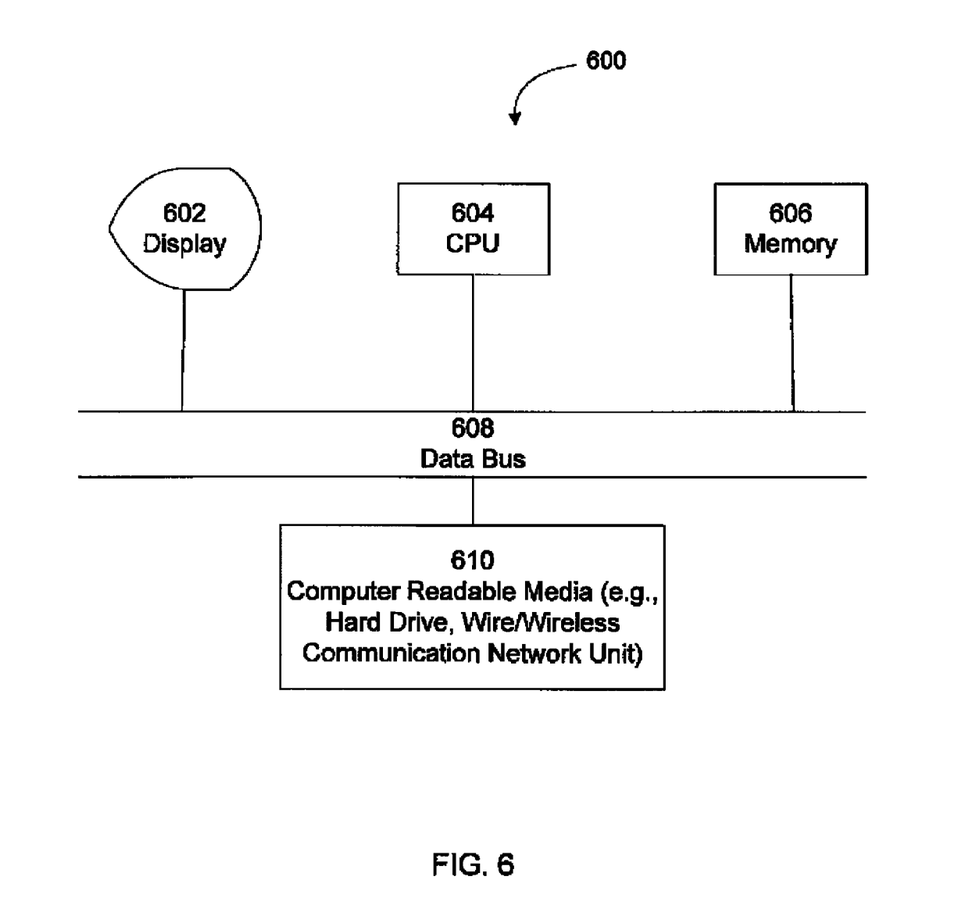
FIG. 6 is a functional block diagram of an apparatus wirelessly communicating a frame structure among nodes using single channel, according to an embodiment.

FIG. 6 is a functional block diagram of an apparatus wirelessly communicating a frame structure among nodes using single channel, according to an embodiment. In FIG. 6, the apparatus 600 can be any computing device wirelessly communicating with other devices, for example, (without limitation) functioning or operating as a Base Station 102 and/or Relay Station 104 and using a frame structure according to the embodiments. The apparatus 600 may include a display 602 to display a user interface or an interface to connect to an external display device. A controller 604 (e.g., a central processing unit) executes instructions (e.g., a computer program or software) that control the apparatus to perform baseband operations. Typically, a memory 606 stores the instructions for execution by the controller 604. According to an aspect of an embodiment, the apparatus is in communication with any computer readable media 610, such as (without limitation) physical computer readable recording media (e.g., a hard drive, memory), or wire/wireless communication network unit(s) implemented in software and/or computing hardware communicating via wire/wireless carrier wave signals. According to an aspect of an embodiment, the apparatus 600 is in wireless communication with a target wireless communication network, such as (without limitation) MMR-cell 100. The display 602, the CPU 604, the memory 604 and the computer readable media 610 are in communication by the data bus 608.

Figure 7:
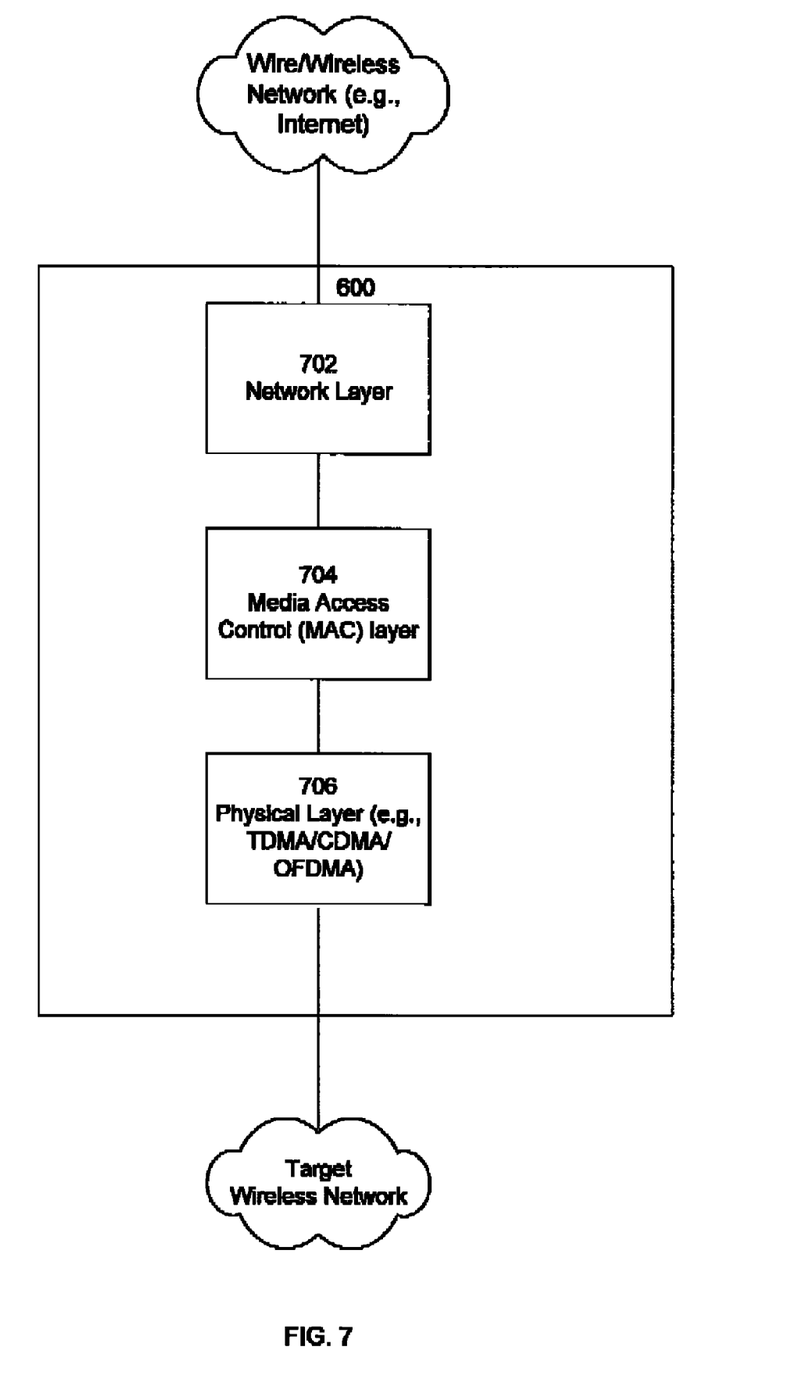
FIG. 7 is a functional diagram of processing layers (software and/or computing hardware) in the apparatus of FIG. 6, according to an embodiment.

FIG. 7 is a functional diagram of processing layers (software and/or computing hardware) in the apparatus of FIG. 6, according to an embodiment. In FIG. 7, the processing layers comprise a network layer 702, a Media Access Control (MAC) layer 704 and a physical layer 706. FIG. 7 processing layers are logical layers, and the embodiments are not limited to these example processing layers and other processing layer configurations may be provided. According to an aspect of an embodiment, the network layer 702 is software executed by the controller 704. The MAC 704 and physical layers 706 are software and/or computing hardware included as computer readable media in the wireless communication network unit 610. The MAC layer 704 and physical layer 706 implement various target wireless network access specifications, such as (without limitation) TDD, FDD and/or CDMA. A target wireless network example can be the MMR-cell 100. The embodiments can be software (as stored or encoded on any known computer readable media 610, such as computer readable recording media, without limitation, a compact disk, a Digital Versatile Disc (DVD), memory, or communication media of carrier wave or electro-magnetic signals, etc.) and/or on any computing hardware. In one embodiment, a wireless communication frame is constructed and transmitted in the MAC layer 704 and/or the physical layer 706 specification of target wireless network nodes, for example, in a base station (BS) 102 and/or in a relay second node (RS) 104. Typically (without limitation) the network layer 702 provides wire and/or wireless communication access to private/public network(s) (e.g., Internet) other than the target wireless network. The network layer 403 can be used for management functions, such as dynamically (real-time) (e.g., for example, according to network resource conditions) provide (download) the configuration/control parameters set up by the first node in wireless communication with a relay second node to third nodes.

The embodiments provide a benefit of maximal degree of flexibility for a first node and a relay second node to one or more third nodes to share resources (bandwidth) of a single channel, for example, in case of the MMR-cell 100, the BS 102 and an RS 104 to use the radio resources of a single channel in the RS microcell 108. Compared with the scheme in FIG. 2, the new embodiment frame structure is very flexible, because, for example, the BS can assign arbitrary proportion of the bandwidth to the transmissions BS→RS, RS→MS, RS→BS, MS→RS dependant on the amount of traffic generated in different parts, for example, various RS microcells 108 of the MMR network 100. It makes a MMR network 100 adaptive to different user distributions and user traffic patterns. The embodiments described provide the relay second node having a single radio interface, for example, to reduce cost, which also mandates the relay second node to use the same channel to communicate with the first node and with the third node(s) served or serviced by the relay second node, however, the embodiments are not limited to such a configuration and can be provided in a wireless communication cell in which one or more of the relay second nodes communicate over a single channel, but other relay second nodes might communicate over a plurality of channels. According to an aspect of an embodiment, in such a mixed single channel or multi channel relay second node cell, one or more of the single channel relay second nodes may be targets of radio resource management.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method, comprising:
   transmitting at same time a first node and a relay second node preambles aligning data frames of the first node and the relay second node, the first node and the relay second node to one or more third nodes all wirelessly communicating in a single channel;
   specifying radio resource control parameters managing radio resources of the wireless communication in the single channel among the aligned first node and the relay second node to the third nodes; and
   periodically transmitting to the relay second node a relay resynchronization amble sequence managing the aligning in the single channel of the first node frames and the relay second node frames.

2. The method according to claim 1, wherein the radio resource control parameter comprises presence and/or a location of the relay second node resynchronization amble sequence in a next wireless communication link data frame, an index of a plurality of the relay second node resynchronization amble sequences, a burst profile of a next radio resource control parameter, a down link transmission to the relay second node in a next data frame, an uplink transmission from the relay second node to the first node in a next data frame, downlink and/or uplink radio resources of the relay second node to the third nodes in the single channel, or any combinations thereof.

3. The method according to claim 1, wherein the radio resource control parameter specifies downlink and/or uplink channel portion assignment of the relay second node to the third nodes in the single channel, and the method further comprises managing by the relay second node a communication schedule to the third nodes according to the channel portion assignment.

4. The method according to claim 1, wherein the radio resource control parameter is transmitted at end of a wireless communication link frame.

5. The method according to claim 3, wherein the relay second node resynchronization amble sequence is transmitted after the radio resource control parameter.

6. The method according to claim 1, wherein the radio resource control parameter includes the relay second node resynchronization amble sequence.

7. The method of claim 1, wherein the first node dynamically specifies the radio resource control parameters.

8. The method of claim 1, wherein the radio resource control parameter specifies a transceiving mode switch time in the single channel for the relay second node, based upon radio resource requirements on downlink and/or uplink communication links among the first node and the relay second node to the third nodes.

9. The method according to claim 1,
   wherein the radio resource control parameter specifies downlink and/or uplink channel portion assignment among the first node and the relay second node to the third nodes in the single channel, and
   the method further comprises:
      managing by the first node and/or the relay second node a communication schedule to the relay second node and/or the third nodes in the assigned channel according to the channel portion assignment; and
      specifying the radio resource control parameter by the first node, the relay second node, or any combination thereof.

10. The method according to claim 9, wherein the radio resource control parameter comprises presence and/or a location of the relay second node resynchronization amble sequence in a next wireless communication link data frame, an index of a plurality of the relay second node resynchronization amble sequences, a burst profile of a next radio resource control parameter, a down link transmission to the relay second node in a next data frame, an uplink transmission from the relay second node to the first node in a next data frame, downlink and/or uplink radio resources of the relay second node to the third nodes in the single channel, a transceiving mode switch time in the single channel for the relay second node, or any combinations thereof.

11. The method of claim 1, wherein the nodes wirelessly communicate according to orthogonal frequency-division multiple access (OFDMA) system using one or more sets of subcarriers in the single channel.

12. An apparatus as a first node in wireless communication in a single channel with a relay second node to one or more third nodes, comprising:
   a controller
      controlling transmission at same time first and relay second node preambles aligning data frames among the first node and the relay second node wirelessly communicating in the single channel;
      transmitting by the first node one or more radio resource control parameters managing radio resources of the wireless communicating in the single channel among the aligned first node and the relay second node to the third nodes; and
      periodically transmitting to the relay second node a relay resynchronization amble sequence managing synchronizing in the single channel the relay second node frames with the first node frames.

13. The apparatus according to claim 12, wherein the radio resource control parameter comprises presence and/or a location of the relay second node resynchronization amble sequence in a next wireless communication link data frame, an index of a plurality of the relay second node resynchronization amble sequences, a burst profile of a next radio resource control parameter, a down link transmission to the relay second node in a next data frame, an uplink transmission from the relay second node to the first node in a next data frame, downlink and/or uplink radio resources of the relay second node to the third nodes in the single channel, or any combinations thereof.

14. The apparatus according to claim 13, wherein the radio resource control parameter specifies downlink and/or uplink channel portion assignment of the relay second node to the third nodes in the single channel.

15. The apparatus according to claim 13, wherein the radio resource control parameter is transmitted near end of a wireless communication link data frame.

16. The apparatus according to claim 14, wherein the relay second node resynchronization amble sequence is transmitted after the radio resource control parameter.

17. The apparatus according to claim 13, wherein the radio resource control parameter includes the relay second node resynchronization amble sequence.

18. The apparatus of claim 13, wherein the controller dynamically specifies and transmits the radio resource control parameters.

19. The apparatus of claim 13, wherein the controller wirelessly communicates with the second relay node to the third nodes and/or directly with the third nodes in a WiMAX Mobile Multi-hop Relay-Based Cell (MMR-Cell) and the first node is a base station and the third nodes are user mobile stations.

20. The apparatus of claim 19, wherein the controller wireless communicates according to orthogonal frequency-division multiple access (OFDMA) system using one or more sets of subcarriers in the single channel.

* * * * *